July 15, 1941.  T. I. DUFFY  2,248,971
BICYCLE ACCESSORY
Filed Sept. 11, 1939  2 Sheets-Sheet 1
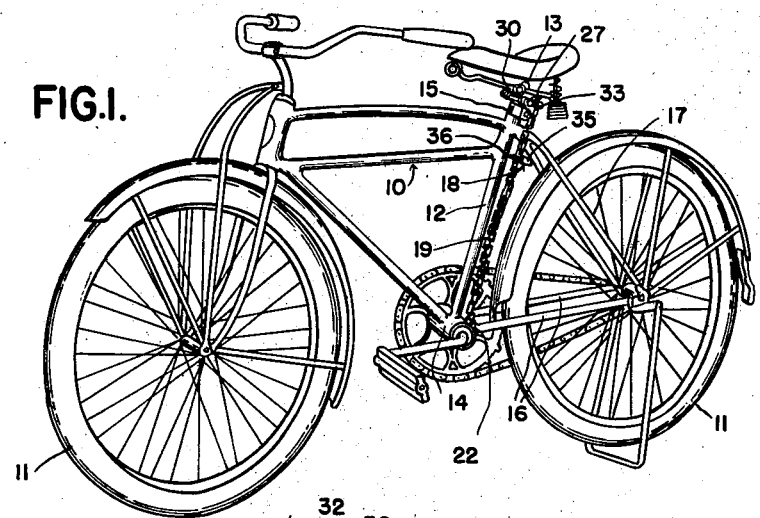
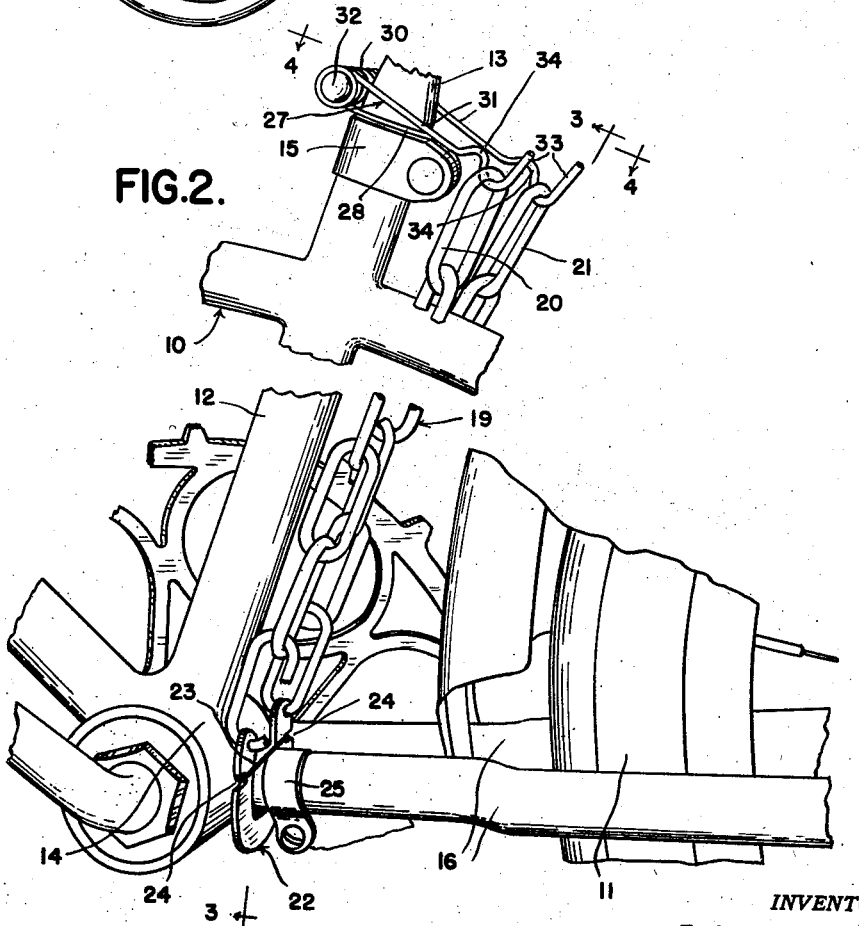
INVENTOR.
THOMAS I. DUFFY
BY
ATTORNEYS July 15, 1941.   T. I. DUFFY   2,248,971
BICYCLE ACCESSORY
Filed Sept. 11, 1939   2 Sheets-Sheet 2
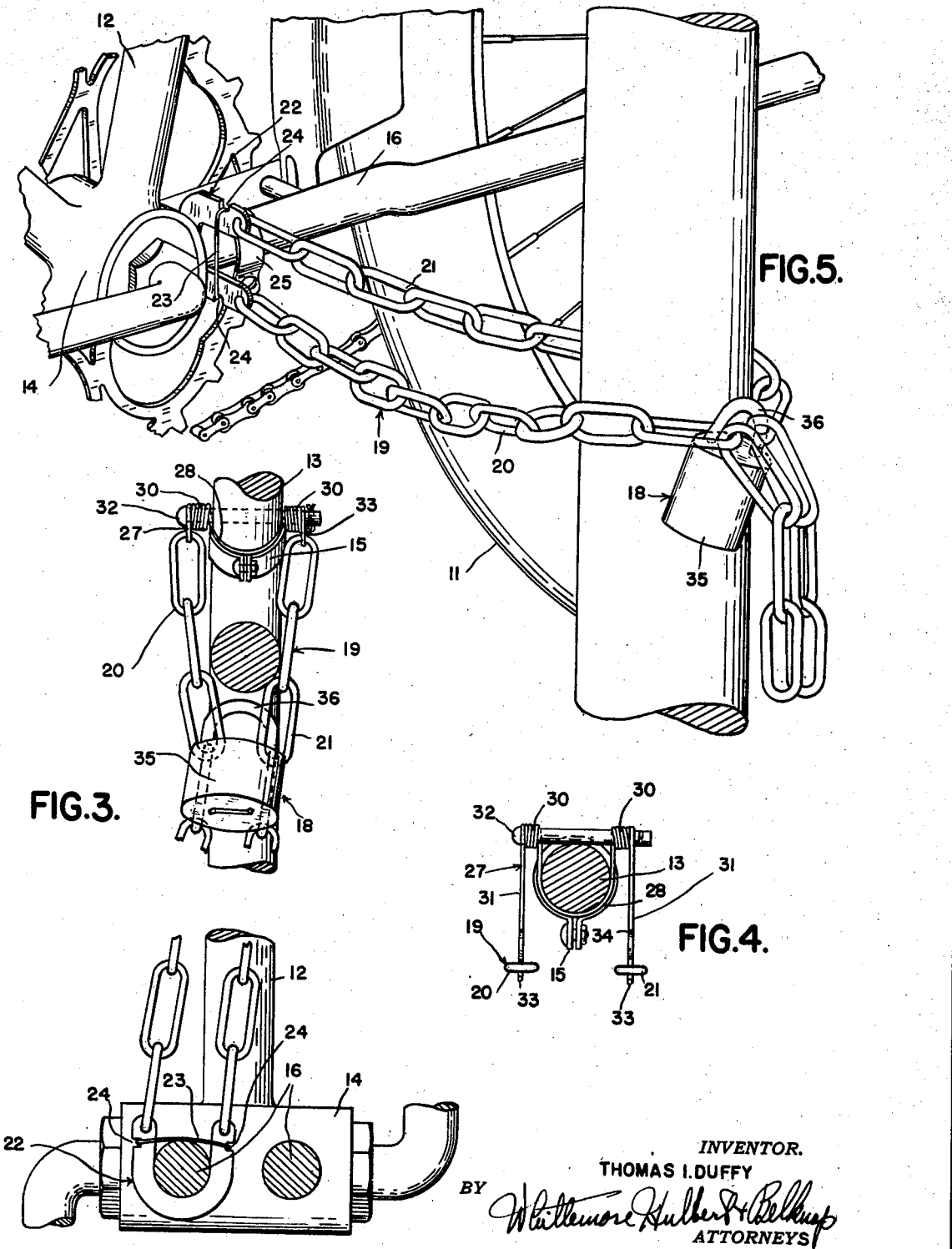
INVENTOR.
THOMAS I. DUFFY
BY
ATTORNEYS Patented July 15, 1941

2,248,971

UNITED STATES PATENT OFFICE 2,248,971

BICYCLE ACCESSORY

Thomas I. Duffy, Detroit, Mich., assignor to Ethel M. Benedict, Highland Park, Mich.

Application September 11, 1939, Serial No. 294,382

9 Claims. (Cl. 280—289)

This invention relates to an accessory particularly applicable to bicycles and refers more especially to an improved locking device for bicycles.

It has been proposed in the past to lock a bicycle against unauthorized use by providing a flexible linear member or chain and a padlock of orthodox design having a bow adapted to be extended through links of the chain. In use, an intermediate portion of the chain is usually extended around a part of the bicycle frame and the free end portions are either extended through a wheel of the bicycle between adjacent spokes of the wheel, or are looped around a post or other permanent anchor. In either case, the free end portions of the chain are secured together by a padlock having a bow adapted to extend through links at the free ends of the chain.

Locking devices of the above general type have been found particularly effective to prevent unauthorized use of a bicycle but have proved a source of inconvenience to the user due primarily to the lack of an adequate place to store the locking device when not in use. It has been customary to store the chain by wrapping the same around a part of the bicycle frame, but this arrangement is undesirable not only due to the time required to store and release the chain, but also because of the constant noise resulting from rattling of the chain against the frame of the bicycle.

The present invention renders it possible to take advantage of the effectiveness of the chain type locking device briefly defined above without the usual accompanying objections and inconveniences previously referred to. In accordance with this invention, the locking device is not only supported on the bicycle in a position to be readily accessible when desired, but is also supported in a manner to prevent rattling of the chain against any part of the bicycle frame during operation.

The foregoing, as well as other objects, will be made more apparent as this description proceeds, especially when considered in connection with the accompanying drawings, wherein—

Figure 1 is a side elevational view of a bicycle equipped with an accessory forming the subject matter of this invention;

Figure 2 is an enlarged side elevational view of a portion of the construction shown in Figure 1;

Figure 3 is a cross sectional view taken substantially on the plane indicated by the line 3—3 of Figure 2;

Figure 4 is a cross sectional view taken substantially on the plane indicated by the line 4—4 of Figure 2;

Figure 5 is a fragmentary perspective view illustrating the locking device in use.

Referring now to the drawings, it will be noted that I have illustrated my improved accessory in connection with a conventional bicycle having a frame 10 and having ground engaging wheels 11 mounted on the frame. In accordance with the usual practice, the frame 10 is provided with a substantially vertically extending frame bar 12 in the form of a tube telescopically receiving a saddle seat supporting post 13 at the upper end and having the lower end secured to a hub 14 within which the usual drive shaft is journaled. The post 13 is slidably mounted in the upper end of the tube 12 to permit locating the saddle at different elevations and the post is secured in any one of its several positions by means of a split clamp 15. Upon reference to Figure 1, it will be noted that a pair of laterally spaced substantially horizontal frame bars 16 extend rearwardly from the hub 14 at opposite sides of the rear wheel of the bicycle and cooperate with the usual diagonally extending yoke 17 to form a support for the rear wheel.

The accessory forming the subject matter of this invention comprises a locking device 18 having a linear member 19 in the form of a link chain composed of two sections 20 and 21. As shown in Figure 3, the links at the adjacent ends of the sections are connected together by means of a U-shaped retainer 22 having the leg portions spaced from each other a sufficient distance to receive one of the frame bars 16 therebetween and normally held in assembled relation with the latter frame bar 16 by means of a removable wire clip 23. The wire clip 23 is looped around the free ends of the leg portions of the retainer in a manner to extend over the frame bar 16 and is held in place by engaging in suitable notches 24 formed in each of the leg portions of the retainer. The retainer is, of course, loosely mounted on the frame bar to permit movement of the same from the position thereof shown in Figure 2 to the position illustrated in Figure 5 and, if it is desired to prevent sliding movement of the retainer on the frame bar, a strap 25 may be clamped on the frame bar in a position to cooperate with the hub 14 to prevent shifting movement of the retainer. Also, it is to be noted that the retainer 22 may be readily removed from the bar 16 and assembled on another part of the frame in the event it is desired to lock the bicycle to a front wheel stand or to some other anchor which cannot be reached from the position of the retainer shown in Figure 1.

When not in use, the linear member 19 is held in the position thereof shown in Figure 2 by means of a hanger 27 preferably formed of spring wire and having an intermediate substantially U-shaped portion 28 adapted to receive the saddle supporting post between the leg portions thereof. Upon reference to Figure 4, it will be noted that the ends of the legs of the U-shaped portion 28 are coiled to provide laterally outwardly extending springs 30 having the free ends extended rearwardly to form spring fingers 31 at opposite sides of the post 13. The coils or springs 30 are arranged in alignment with each other at the front side of the post and receive a headed pin 32 for the purpose of holding the hanger in assembled relation with the post.

The free ends of the spring fingers are fashioned with upwardly opening hooks 33 and these hooks respectively receive the links at the free ends of the sections 20 and 21 on the linear member 19. It will be understood that the hook ends of the spring fingers 31 are normally urged by the springs 30 to a position wherein the distance between the hook ends and the frame bar 16 is substantially greater than the length of the linear member 19. As a result, the springs must be tensioned by moving the fingers downwardly in order to engage the links at the free ends of the sections 20 and 21 with the hooks. It follows, therefore, that the linear member 19 is held taut and there will be no tendency for the same to rattle against the frame of the bicycle. It may be pointed out at this time that the fingers 31 are fashioned with upwardly extending looped portions 34 adjacent the hooks 33 providing finger engaging parts to facilitate tensioning of the spring fingers when the linear member is assembled with the hanger.

The locking device 18 is also provided with a padlock 35 having a bow 36 adapted to pass through links of the chain sections 20 and 21 at a point below the diagonal frame bar 17 so as to lock the chain on the bicycle. The lock 35 is of conventional design and may either be of the key operated type or may be of the combination type requiring secret information in order to open the same.

Assuming that the locking device is in the position thereof shown in Figure 1 and that it is desired to lock the bicycle against unauthorized use, the operator merely unhooks the free ends of the sections 20 and 21 from the fingers 31. The lock 35 may then be disengaged from the linear member and the free ends of the sections may either be extended through the rear wheel between adjacent spokes or may be looped around the anchor post in the manner shown in Figure 5. The bow of the lock is then extended through a link in each section of the linear member and moved to its locking position. Return of the locking device to the storage position on the bicycle is just as simple in that the lock is released from the free ends of the sections and the latter ends are merely hooked over the fingers 31. The lock may then be engaged with the sections of the linear member 19 in the manner shown in Figure 1 so that removal of the linear member from the bicycle by unauthorized persons is prevented.

Thus, from the foregoing, it will be observed that I have provided a locking device which is always accessible and may be readily manipulated to either lock or release the bicycle, as desired.

It will also be apparent that the locking device is held in a position where it does not interfere with manipulation of the bicycle and is supported in a manner to prevent rattling of the sections of the linear member when the bicycle is in use.

What I claim as my invention is:

1. An accessory for bicycles having a frame composed of a plurality of bars, said accessory comprising a pair of flexible linear members, a substantially U-shaped retainer adapted to receive one of the frame bars of the bicycle frame between the leg portions thereof and having the free ends of the leg portions secured to adjacent ends of the linear members, means carried by the leg portions of the retainer and extending over the frame bar aforesaid of the bicycle frame to hold the retainer in assembled relation with said frame bar, and means carried by another of the frame bars and removably engaging the free ends of the linear members to hold the latter in assembled relation with the bicycle.

2. An accessory for bicycles having a frame provided with an upright frame bar and having a saddle seat supported on the upper end of said bar, said accessory comprising a flexible linear locking member having a portion attachable to the bicycle frame adjacent the lower end of the upright bar, and a hanger mounted upon the top of the bar adjacent the saddle seat and having a spring finger removably connected to the linear locking member to hold the latter taut adjacent said upright bar.

3. An accessory for bicycles having a frame provided with an upright bar having a tubular portion for receiving a saddle seat supporting post and provided with a frame bar at the lower end of the upright bar, said accessory comprising a pair of flexible linear locking members having adjacent ends secured together with the second frame bar extending therebetween, a hanger mounted on the top of the upright frame bar and having laterally spaced spring fingers respectively removably engaging the free ends of the linear members to hold the latter taut adjacent the upright bar, and means carried by the hanger and cooperating with the saddle seat supporting post to hold the hanger in position on the bicycle frame.

4. An accessory for bicycles having a frame provided with an upright bar having a tubular portion at the upper end telescopically receiving a saddle seat supporting post and provided with a substantially horizontal frame bar at the lower end of the upright frame bar, said accessory comprising a flexible linear locking member composed of sections, a substantially U-shaped retainer adapted to receive a portion of the horizontal bar between the leg portions thereof and having the free ends of the leg portions respectively connected to the adjacent ends of the sections, a hanger seated upon the top of the upright bar and having laterally spaced spring fingers provided with hook portions at the free ends removably engaging the free end portions of the sections to hold the latter taut adjacent the upright bar, and means carried by the hanger cooperating with the saddle seat supporting post to hold the hanger in assembled relationship with the bicycle.

5. An accessory for bicycles having a frame, said accessory comprising a retainer member rotatably and removably mounted on a part of the bicycle frame, a flexible linear locking member composed of sections and having adjacent ends of the sections extending on opposite sides of the part aforesaid of the frame and connected to the retainer member, and means carried by another part of the bicycle frame and removably engaging the free ends of the sections to hold the latter taut on the frame when not in use.

6. An accessory for bicycles having a frame composed of a plurality of frame bars, said accessory comprising a flexible linear locking member having a portion intermediate the ends looped around one of the frame bars and having free ends, and means carried by another part of the bicycle frame for removably engaging the free ends of said member and having provision for holding the latter under tension in assembled relation with the frame.

7. An accessory for bicycles having a frame composed of a plurality of frame bars, said accessory comprising a pair of flexible linear locking members, a substantially U-shaped member adapted to receive one of the frame bars between the leg portions thereof and secured to adjacent ends of the linear members, and means carried by another frame bar of the bicycle frame for removably engaging the free ends of the members and having provision for holding the latter taut on the bicycle frame when not in use.

8. An accessory for bicycles having a frame composed of a plurality of frame bars, said accessory comprising a pair of flexible linear locking members having adjacent ends secured together and adapted to be looped around one of the frame bars, and a hanger attachable to another of the frame bars and having laterally spaced spring fingers removably engaging the free ends of the members to hold the latter taut in assembled relation with the bicycle frame.

9. An accessory for bicycles having a frame provided with an upright frame bar having a tubular portion for receiving a saddle seat supporting post and provided with a frame bar extending rearwardly from the lower end of the upright frame bar, said accessory comprising a member rockably mounted on the rearwardly extending frame bar adjacent the lower end of the upright frame bar, a hanger having a portion seated on the upper end of the upright frame bar and having spring fingers extending at opposite sides of the saddle seat supporting post and terminating in hooked portions, and a pair of flexible locking members having the lower ends secured to the member aforesaid and having the upper ends respectively attachable to the hooked end portions of the fingers on said hanger.

THOMAS I. DUFFY.